US009590469B2

(12) United States Patent
Post (10) Patent No.: US 9,590,469 B2
(45) Date of Patent: Mar. 7, 2017

(54) TRANSVERSE-DISPLACEMENT STABILIZER FOR PASSIVE MAGNETIC BEARING SYSTEMS

(71) Applicant: Lawrence Livermore National Security, LLC, Livermore, CA (US)

(72) Inventor: Richard F Post, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 94 days.

(21) Appl. No.: 14/628,018

(22) Filed: Feb. 20, 2015

(65) Prior Publication Data

US 2016/0248298 A1    Aug. 25, 2016

(51) Int. Cl.
*H02K 7/09*    (2006.01)
(52) U.S. Cl.
CPC ..................................... *H02K 7/09* (2013.01)
(58) Field of Classification Search
CPC ........................................................ H02K 7/09
USPC ......................................................... 310/90.5
See application file for complete search history.

(56) References Cited

U.S. PATENT DOCUMENTS

| 3,572,854 | A | * | 3/1971 | Danby | F16C 32/0408 310/90.5 |
| 5,177,387 | A | * | 1/1993 | McMichael | F16C 32/0438 310/90 |
| 5,302,874 | A | * | 4/1994 | Pinkerton | F16C 32/044 310/90.5 |
| 5,481,146 | A | * | 1/1996 | Davey | B60L 13/04 310/154.05 |
| 5,495,221 | A | | 2/1996 | Post | |
| 5,525,848 | A | * | 6/1996 | Pinkerton | F16C 32/044 310/113 |
| 5,789,837 | A | * | 8/1998 | Shin | F16C 32/0438 310/114 |
| 5,847,480 | A | | 12/1998 | Post | |

(Continued)

OTHER PUBLICATIONS

Earnshaw, "On the Nature of the Molecular Forces Which Regulate the Constitution of the Luminiferous Ether," Trans. of the Cambridge Phil. Soc., http://www.biodiversitylibrary.org/pdf2/000824300019797, VII. Part I, p. 97 (1839).

*Primary Examiner* — Burton Mullins
(74) *Attorney, Agent, or Firm* — John P. Wooldridge (57) ABSTRACT

The invention provides a way re-center a rotor's central longitudinal rotational axis with a desired system longitudinal axis. A pair of planar semicircular permanent magnets are pieced together to form a circle. The flux from each magnet is pointed in in opposite directions that are both parallel with the rotational axis. A stationary shorted circular winding the plane of which is perpendicular to the system longitudinal axis and the center of curvature of the circular winding is positioned on the system longitudinal axis. Upon rotation of the rotor, when a transverse displacement of the rotational axis occurs relative to the system longitudinal axis, the winding will experience a time-varying magnetic flux such that an alternating current that is proportional to the displacement will flow in the winding. Such time-varying magnetic flux will provide a force that will bring the rotor back to its centered position about the desired axis.

25 Claims, 9 Drawing Sheets

(56) References Cited

U.S. PATENT DOCUMENTS

| | | | | |
|---|---|---|---|---|
| 6,304,015 B1 * | 10/2001 | Filatov | ............... | F16C 32/0436 310/90.5 |
| 6,365,997 B1 * | 4/2002 | Werfel | ............... | F16C 32/0438 310/90.5 |
| 6,799,462 B1 * | 10/2004 | Berstis | .................... | G01V 7/02 33/345 |
| 6,828,890 B2 * | 12/2004 | Cope | ........................ | H01F 7/20 335/222 |
| 6,867,520 B2 * | 3/2005 | Jennings | ............ | F16C 32/0493 310/74 |
| 7,078,838 B2 * | 7/2006 | Post | ........................ | H02K 7/09 310/156.01 |
| 8,581,463 B2 * | 11/2013 | Post | ................... | F16C 32/0427 310/401 |
| 8,823,233 B2 * | 9/2014 | Post | ................... | F16C 32/0436 310/90.5 |
| 2008/0122308 A1 * | 5/2008 | Mleux | .................. | F16C 32/044 310/90.5 |
| 2013/0020895 A1 * | 1/2013 | Scalzo | .................. | H02K 7/025 310/90.5 |

* cited by examiner

TRANSVERSE-DISPLACEMENT STABILIZER FOR PASSIVE MAGNETIC BEARING SYSTEMS

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Field of the Invention

The present invention relates to magnetic stabilizer systems for application to passive magnetic bearing systems, and more specifically, it relates to stabilizers is especially suitable for stabilizing "tilt" modes and/or transverse displacement modes of magnetically levitated rotating objects.

Description of Related Art

The essence of Earnshaw's theorem, when it is applied to magnetic forces between permanent magnets, is that it proves that it is impossible to stably levitate (in static equilibrium) a permanent magnet element through the forces exerted by any fixed configuration of other permanent magnets. Earnshaw's Theorem also applies to electric charges, where it asserts that no fixed configuration of static charges can be found that will stably levitate another static charge. Earlier approaches to overcoming the magnetic version of the theorem, such as those described in U.S. Pat. No. 5,495,221 and U.S. Pat. No. 5,847,480, are based on the use of Halbach arrays interacting with specially configured planar windings to achieve stabilization. It is desirable to provide a new magnetic stabilizer configuration that employs a much simpler magnet configuration and stabilizer winding than those employed in the above-listed patents.

SUMMARY OF THE INVENTION

A novel passive magnetic bearing stabilizer is provided that involves a simpler magnetic structure and conductor array than previous stabilizers, e.g., those described in U.S. Pat. Nos. 5,495,221 and 5,847,480. The results of a computer simulation of the stabilizer show that the operating parameters of the stabilizer can be made to be comparable to the parameters achievable in the cited patents, but with a major reduction in complexity.

More specifically, the invention is both an apparatus and a method of operating the apparatus. A desired system longitudinal axis is determined. A cylindrical rotor has a central longitudinal rotational axis. It is desirable that as the rotor rotates, the central longitudinal axis remains coaxial with the system longitudinal axis. The invention provides a way to achieve this coaxial operation. The rotor includes a first planar semicircular permanent magnet and a second planar semicircular permanent magnet. The magnet configurations are set such that the flux of one planar semicircular permanent magnet is pointed in a direction parallel with the rotational axis and toward a first end of the rotor, and the flux of the other planar semicircular permanent magnet is pointed in a direction parallel with the rotational axis and toward a second end of the rotor. The invention includes a stationary shorted circular winding the plane of which is perpendicular to the system longitudinal axis and the center of curvature of the circular winding is positioned on the system longitudinal axis. Upon rotation of the rotor, when a transverse displacement of the central longitudinal rotational axis occurs relative to the system longitudinal axis, the winding will experience a time-varying magnetic flux such that an alternating current that is proportional to the displacement will flow in the winding. Such time-varying magnetic flux will provide a force that will bring the rotor back to its centered position about the desired axis.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1A:
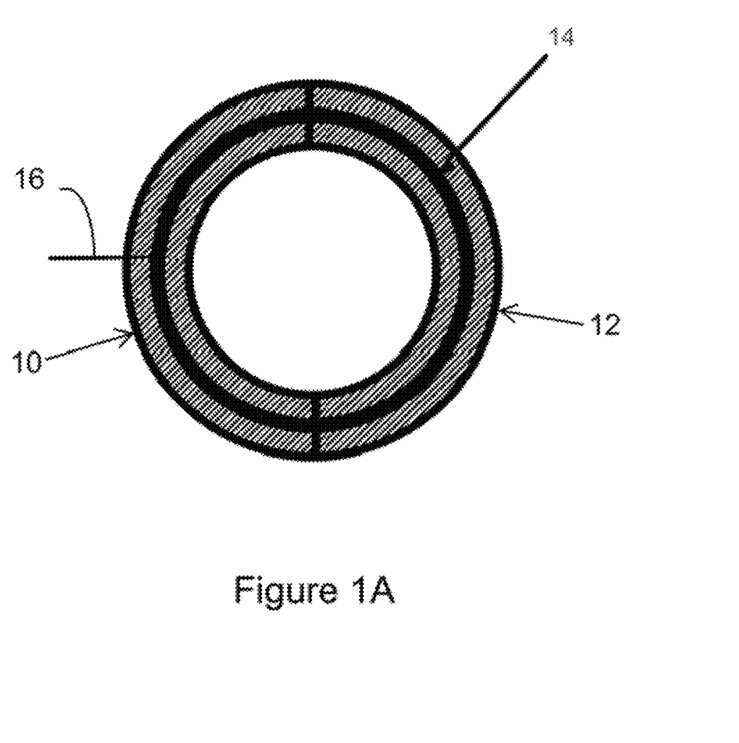
FIG. 1A is a schematic top view drawing of a displaced-ring stabilizer for passive magnetic bearing systems.
Figure 1B:
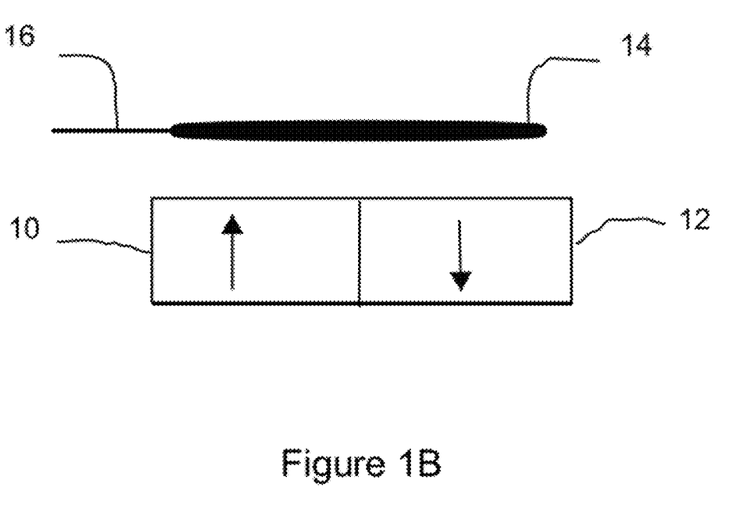
FIG. 1B is a side view drawing of the displaced-ring stabilizer of FIG. 1A

This invention provides a new stabilizer geometry for overcoming the limitations imposed by Earnshaw's Theorem as it is encountered in performing the design of passive magnetic bearing systems. The magnetic configuration, as shown schematically in the top view of FIG. 1A, consists of two planar semi-circular permanent magnets 10, 12, one of which has its North pole pointed upward, while the other magnet has its South pole pointed upward. That is, the planar semi-circular permanent magnets are configured so that the flux of one points upward and the flux of the either one points downward. These magnets are attached to the rotating element (e.g., a flywheel rotor) of the system, while the shorted circular winding 14 is attached to a stationary support 16. In one embodiment, the magnet configuration is placed in the inner bore of a cylindrical rotor. Other configurations are possible, some of which are described below. Based on the teachings herein, those skilled in the art will recognize still other embodiments. Placement in the inner bore utilizes the rotor itself to restrain the magnets when subjected to centrifugal forces that would result from high speed rotation of the rotor. FIG. 1B shows a side view of the configuration of FIG. 1A. This configuration can be placed at one of both ends of a rotor to provide transverse stabilization. Note that this configuration can be place at one or both ends of a hollow cylindrical rotor. By placing the magnet configuration internal to the cylinder, the cylinder walls can act as a buttress to hold the magnets despite significant centrifugal forces. The invention can be used to stabilize the rotor against tilt and transverse displacements. If the rotor is placed in a horizontal position, placement of a stabilizer at both ends can provide a levitational force.

As the magnet configuration rotates in a position such that its central rotation axis is centered at a desired system axis, the net magnetic flux through the winding is zero and the currents that flow in the winding will approach or be nearly zero. However, whenever a sufficient transverse displacement of the axis of rotation of the magnets relative to the desired system axis occurs, the winding will experience a time-varying magnetic flux. As a result, an alternating current that is proportional to the displacement will flow in the winding. As predicted by Lenz's Law, this current will result in a centering force on the rotating magnet system. This restoring force can be used to stabilize the levitating magnet system against Earnshaw Theorem-related instabilities involving lateral or tilt displacements.

Example Magnetic Field Configuration

Figure 2:
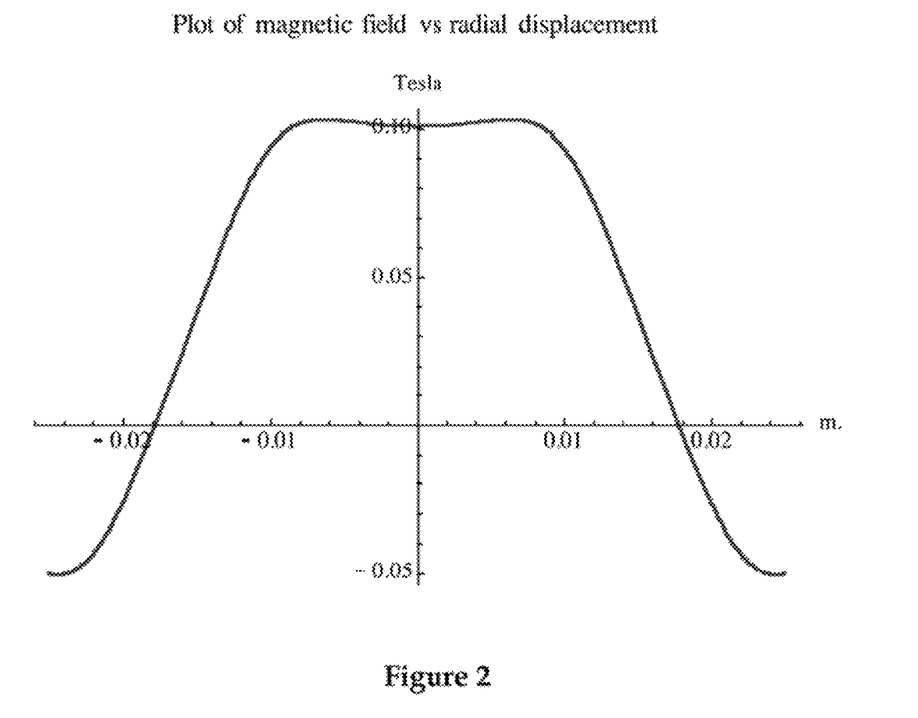
FIG. 2 is a plot of magnetic field intensity of a semicircular pole vs radial displacement at a gap of 5.0 mm. between the magnets and the shorted loop.

A simple magnetic field configuration that is suitable for use in the stabilizer, and which is a simple one to analyze theoretically, is one for which the magnetic field intensity has the form of a flat-topped plateau with a width of the plateau that is greater than twice the allowable transverse displacement of the rotating system with respect to the central axis. A calculated plot of such a field, produced by a permanent magnet array made of ferrite permanent magnet material (Br=0.39 Tesla) is shown in FIG. 2. The field plot was calculated assuming a 5.0 mm gap between the upper face of the magnets and the center line of the shorted loop winding. Thus, FIG. 2 is a plot of magnetic field intensity of a semi-circular pole versus radial displacement at a gap of 5.0 mm between the magnets and the shorted loop.

Figure 3:
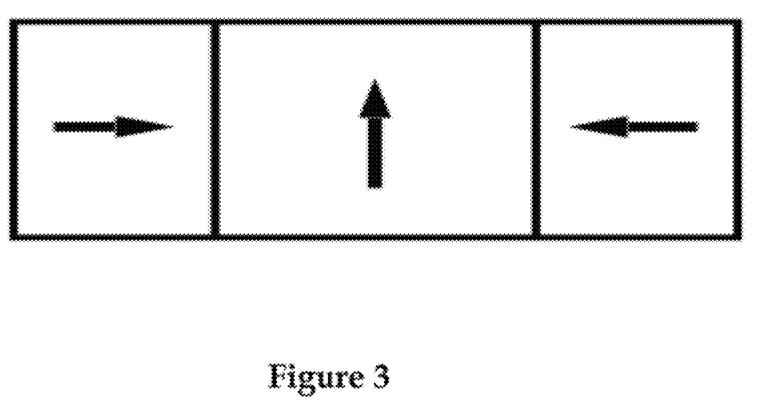
FIG. 3 shows magnet proportions and polarization directions for semicircular pole element with upwardly directed field polarization.

An example way to achieve such a field is to employ three concentric semicircular arcs of permanent-magnet material with polarizations as shown schematically in FIG. 3 (in this case corresponding to the semicircular pole of FIG. 1A having an upwardly directed field). The center magnet would be pointed in opposite directions for each planar semi-circular permanent magnet. Thus, FIG. 3 shows magnet proportions and polarization directions for semicircular pole element with upwardly directed field polarization.

Figure 4:
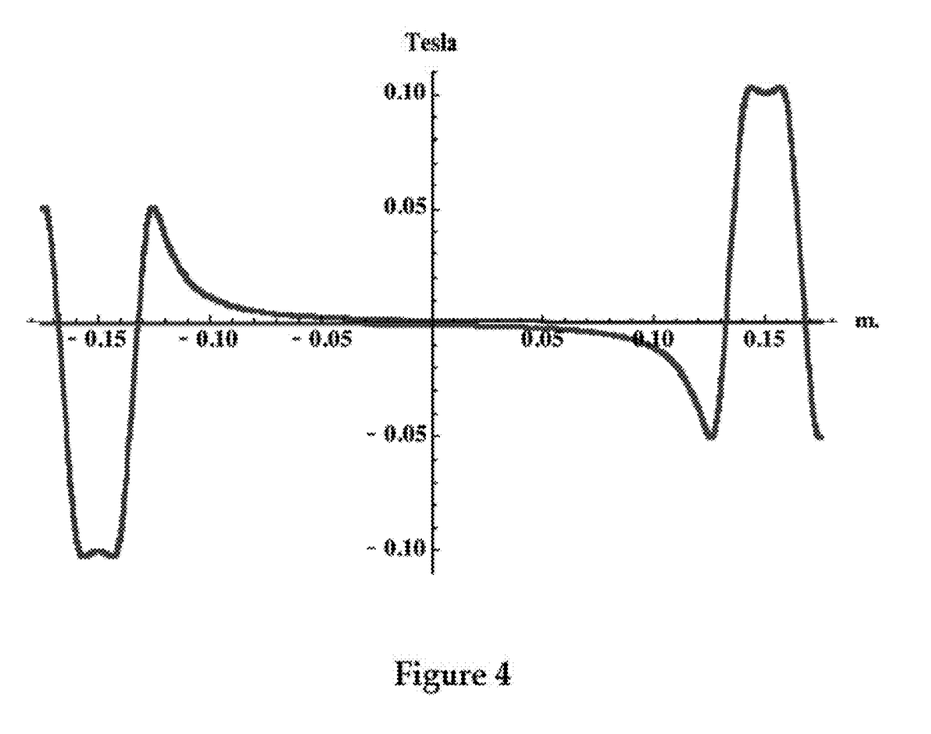
FIG. 4 is a plot of magnetic field intensity taken across the diameter of the conducting loop when the loop and magnet axes are coaxial.

FIG. 2 shows only the upward-directed portion of the magnetic field produced by the two semicircular magnets. FIG. 4 shows a plot of the field taken across the diameter of the complete pole assembly. As can be deduced from the plot, when the conducting loop is coaxial with the magnet assembly the net flux through the loop will be zero. However, if the axis of the magnet assembly is displaced relative to the axis of the loop there will be a net periodically varying flux through the loop, resulting in induced currents that in turn produce a restoring force. Thus, FIG. 4 is a plot of magnetic field intensity taken across the diameter of the conducting loop when the loop and magnet axes are coaxial.

Computer Simulation of Restoring Force and Stiffness of Stabilizer

A Mathematica® program was written to calculate the restoring force and stiffness of a small stabilizer employing the magnetic field the intensity of which is shown above in FIG. 2. The field was created by a configuration with magnet polarizations as shown in FIG. 3 (for the semicircular arrays, the one with upward polarization of the center magnet).

Figure 5:
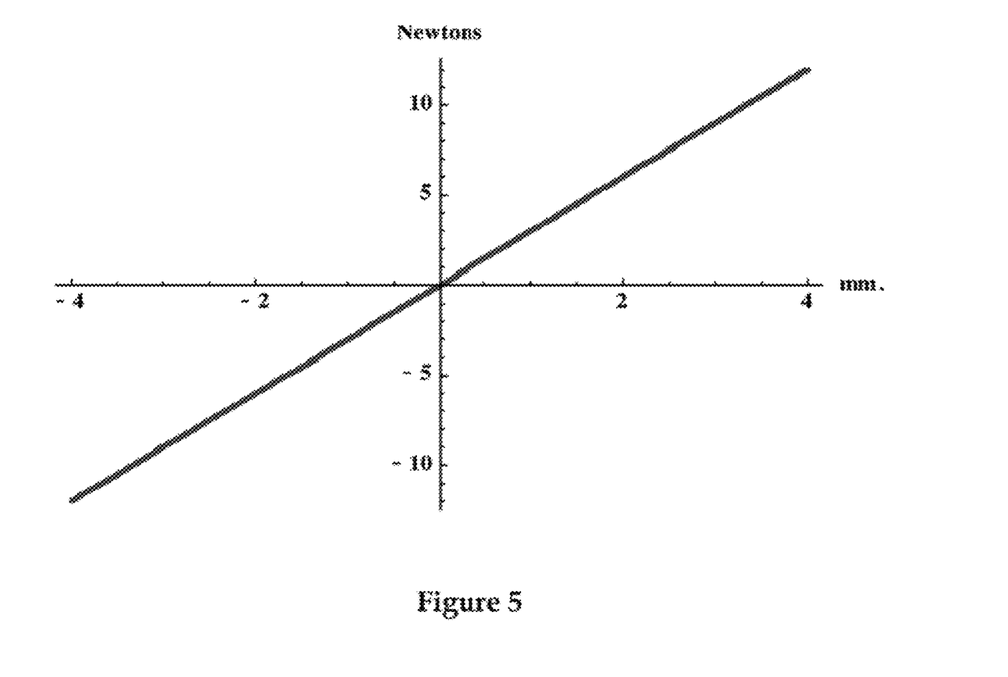
FIG. 5 is a plot of restoring force versus displacement.
Figure 6:
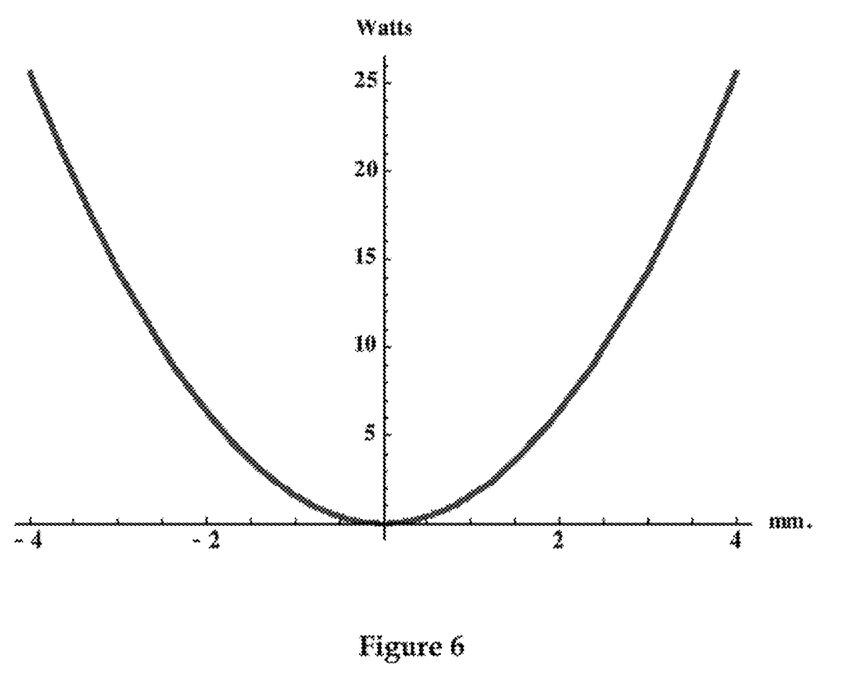
FIG. 6 is a plot of resistive power loss versus displacement.

In the simulation the mean radius of the stabilizer circular winding was 0.15 m. and the rotation speed was 37000 rpm. The circular conductor employed No. 10 Gauge copper litz wire. FIG. 5 is a plot of the calculated restoring force (Newtons) versus displacement (mm.), and FIG. 6 is a plot of the resistive power loss (Watts) versus displacement (mm.). For this example the stiffness was 3.0 Newtons/mm.

Scaling Laws for Stabilizer

The example given in the previous section was for a small stabilizer employing ferrite magnets in the rotating elements of the stabilizer. In cases where higher stiffness and/or lower resistive losses are required, there are several ways these objectives could be accomplished. For example, using two planar, closely nested, stabilizer conductor rings would approximately double the stiffness of the system. To reduce the resistive losses without the loss of stiffness, a larger conductor could be used. Adding an external inductor in series with the conductor ring would also reduce the losses, but at some sacrifice of stiffness. In the example case above, the addition of a high-Q inductance equal in inductance in series with the stabilizer conductor ring would drop the losses at a 1.0 mm. displacement to 0.4 watts (a factor of 4 reduction), but with a reduction in the stiffness of a factor of 3, to 1.0 N/mm.

Increased stiffness could be achieved if permanent magnet material with a higher remanent field (e.g., Samarium-Cobalt, Br=1.3 Tesla) were to be used in place of the ferrite magnets. Thus if SmCo magnets were to be employed in the stabilizer example given above, the predicted stabilizer stiffness would increase to 39 Newtons/mm, an increase of more than an order of magnitude.

Figure 7:
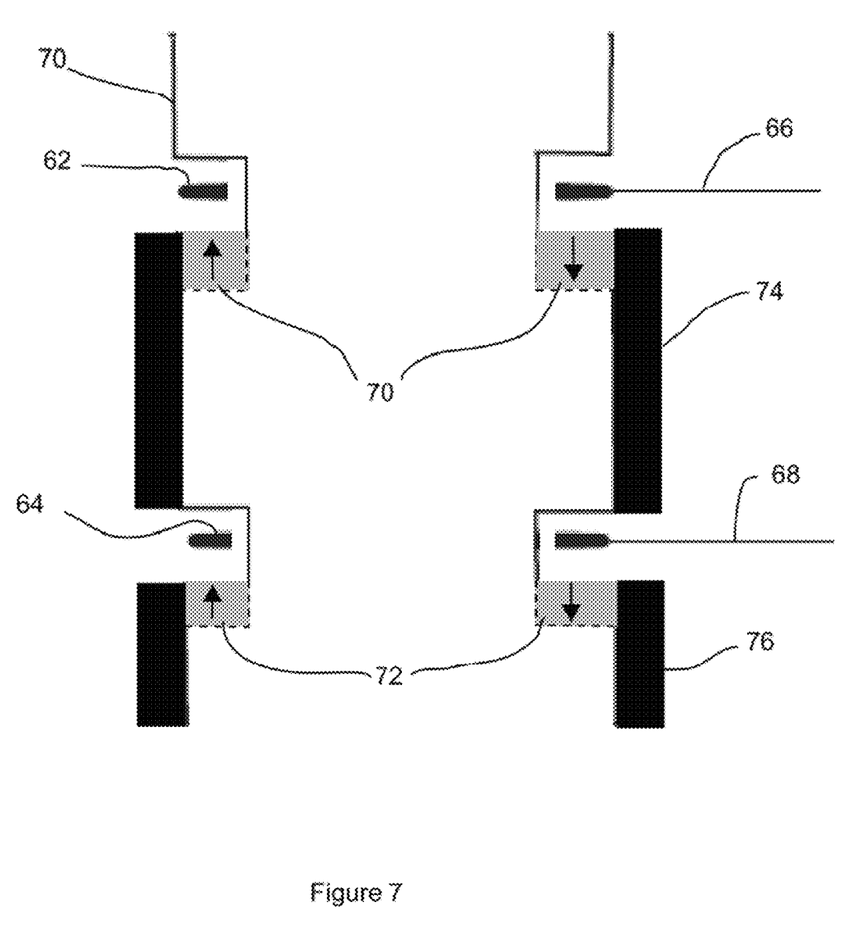
FIG. 7 is a side sectional view of an outer notch embodiment.

FIG. 7 is a cross-sectional side view of an outer notch embodiment. The figure shows a side view of the rotor 60, the conductor rings 62 and 64, attachments 66 and 68 which are fixedly connected to a stationary support (not shown), magnet configurations 70 and 72 and buttress elements 74 and 76. Note that added stiffness can be achieved by placing an additional magnet configuration on the opposite side of the conductor rings, which in this embodiment would be above the conductor ring 62 and above conductor ring 64. The flux direction should be the same as the magnet configuration below the conductor ring. The figure shows two magnet/conductor ring configurations; however, embodiments with a single or more than two magnet/conductor ring are operable depending upon the desired design.

Figure 8:
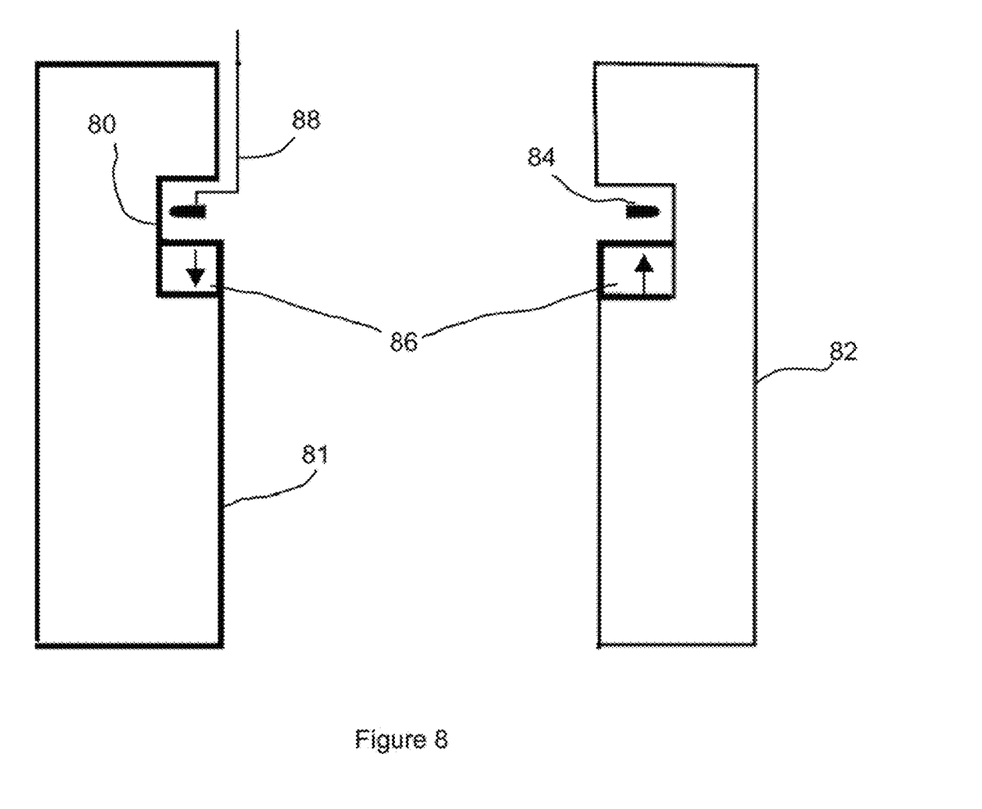
FIG. 8 is a side sectional view of an inner notch embodiment.

FIG. 8 is a cross-sectional view of an inner notch embodiment.

The figure shows a notch 80 on the inner wall 81 of a rotor 82, a conductor winding 84, a magnet configuration 86 and a stationary support connection 88. A buttress is not needed in this embodiment because the notch itself serves to restrain the magnets. As in the embodiment of FIG. 7, added stiffness can be achieved by placing an additional magnet configuration on the opposite side of the conductor rings. The flux direction should be the same as the magnet configuration below the conductor ring. A plurality of magnet/ring configurations could be employed in this embodiment as well as in the embodiment of FIG. 7.

Note that the rotors described above may require additional support bearings, either mechanical or magnetic, to provide stabilization not provided by embodiments of the present invention.

REFERENCES (INCORPORATED HEREIN BY REFERENCE)

[1] S. Earnshaw, "On the Nature of the Molecular Forces which regulate the Constitution of the Luminiferous Ether," Trans. of the Cambridge Phil. Soc., VII. Part I, p. 97 (1839)

[2] R. F. Post: "Dynamically Stable Magnetic Suspension/Bearing System," issued Feb. 271996.

[3] R. F. Post: "Passive Magnetic Bearing Element with Minimal Power Losses," issued Dec. 8, 1998.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An apparatus, comprising:
   a system longitudinal axis;
   a cylindrical rotor having a central longitudinal rotational axis, said rotor including a first planar semicircular permanent magnet and a second planar semicircular permanent magnet, wherein first flux of said first planar semicircular permanent magnet is pointed in a direction parallel with said rotational axis and toward a first end of said rotor and wherein second flux of said second planar semicircular permanent magnet is pointed in a direction parallel with said rotational axis and toward a second end of said rotor; and
   a first stationary shorted circular winding the plane of which is perpendicular to said system longitudinal axis, wherein the center of curvature of said circular winding is positioned on said system longitudinal axis, wherein upon rotation of said rotor, when a transverse displacement of said central longitudinal rotational axis relative to said system longitudinal axis occurs, said winding will experience a time-varying magnetic flux such that a current that is proportional to said displacement will flow in said winding.

2. The apparatus of claim 1, wherein upon rotation of said rotor, when said central longitudinal rotational axis is collinear with said system longitudinal axis, the net magnetic flux through said winding approaches zero and currents flowing in said winding approach zero.

3. The apparatus of claim 1, wherein said first planar semicircular permanent magnet and said second planar semicircular permanent magnet are symmetrical about said central longitudinal axis and each form half of a circle and are configured together to form a circle.

4. The apparatus of claim 1, wherein said first planar semicircular permanent magnet and said second planar semicircular permanent magnet are located at the outer periphery of said rotor.

5. The apparatus of claim 4, wherein said first planar semicircular permanent magnet and said second planar semicircular permanent magnet are located at said first end of said rotor and wherein said winding is spaced from said first end.

6. The apparatus of claim 4, wherein said rotor includes an annular notch that is perpendicular with said rotational axis, wherein and said first planar semicircular permanent magnet and said second planar semicircular permanent magnet are located on a side of said notch that is opposite to said first end and wherein said winding is around said rotor and in said notch.

7. The apparatus of claim 1, wherein said first planar semicircular permanent magnet and said second planar semicircular permanent magnet are located at the outer periphery of said rotor and wherein a buttress is fixedly connected to or integral with the outer wall of said rotor and wherein said buttress is configured to hold said first planar semicircular permanent magnet and said second planar semicircular permanent magnet in place when they are under centrifugal forces.

8. The apparatus of claim 1, wherein said rotor comprises an annular notch on its inner periphery, wherein said notch is perpendicular with said rotational axis, wherein said first planar semicircular permanent magnet and said second planar semicircular permanent magnet are located on a side of said notch that is opposite to said first end and wherein said winding is inside said inner periphery and within said notch.

9. The apparatus of claim 1, wherein said desired system longitudinal axis has an orientation that is selected from the group consisting of vertical and non-vertical.

10. The apparatus of claim 1, wherein at least one of said first planar semicircular permanent magnet or said second planar semicircular permanent magnet comprises ferrite permanent magnet material.

11. The apparatus of claim 1, wherein each of said first planar semicircular permanent magnet and said second planar semicircular permanent magnet comprises a plurality of concentric semicircular arcs of permanent-magnet material.

12. A method, comprising:
    providing the apparatus of claim 1; and
    rotating said rotor, wherein upon rotation of said rotor, when a transverse displacement of said central longitudinal rotational axis relative to said system longitudinal axis occurs, said winding will experience a time-varying magnetic flux such that an alternating current that is proportional to said displacement will flow in said winding.

13. The method of claim 12, wherein upon rotation of said rotor, when said central longitudinal rotational axis is collinear with said system longitudinal axis, the net magnetic flux through said winding approaches zero and currents flowing in said winding approach zero.

14. The method of claim 12, wherein said first planar semicircular permanent magnet and said second planar semicircular permanent magnet are symmetrical about said central longitudinal axis and each form half of a circle and are configured together to form a circle.

15. The method of claim 12, wherein said first planar semicircular permanent magnet and said second planar semicircular permanent magnet are located at the outer periphery of said rotor.

16. The method of claim 15, wherein said first planar semicircular permanent magnet and said second planar semicircular permanent magnet are located at said first end of said rotor and wherein said winding is spaced from said first end.

17. The method of claim 15, wherein said rotor includes an annular notch that is perpendicular with said rotational axis, wherein and said first planar semicircular permanent magnet and said second planar semicircular permanent magnet are located on a side of said notch that is opposite to said first end and wherein said winding is around said rotor and in said notch.

18. The method of claim 12, wherein said first planar semicircular permanent magnet and said second planar semicircular permanent magnet are located at the outer periphery of said rotor and wherein a buttress is fixedly connected to or integral with the outer wall of said rotor and wherein said buttress is configured to hold said first planar semicircular permanent magnet and said second planar semicircular permanent magnet in place when they are under centrifugal forces.

19. The method of claim 12, wherein said rotor comprises an annular notch on its inner periphery, wherein said notch is perpendicular with said rotational axis, wherein said first planar semicircular permanent magnet and said second planar semicircular permanent magnet are located on a side of said notch that is opposite to said first end and wherein said winding is inside said inner periphery and within said notch.

20. The method of claim 12, wherein said desired system longitudinal axis has an orientation that is selected from the group consisting of vertical and non-vertical.

21. The method of claim 12, wherein at least one of said first planar semicircular permanent magnet or said second planar semicircular permanent magnet comprises ferrite permanent magnet material.

22. The method of claim 12, wherein each of said first planar semicircular permanent magnet and said second planar semicircular permanent magnet comprises a plurality of concentric semicircular arcs of permanent-magnet material.

23. The method of claim 12, further comprising a first inductor in series with said first stationary shorted circular winding.

24. The method of claim 12, further comprising a second stationary shorted circular winding nested with said first stationary shorted circular winding.

25. The apparatus of claim 24, further comprising a second inductor in series with said second stationary shorted circular conductor.

\* \* \* \* \*